United States Patent Office 3,187,040
Patented June 1, 1965

3,187,040
DIAZADIPHOSPHETIDINIUM SALTS
Harold F. Wilson, Moorestown, N.J., and Charles E. Glassick, Adrian, Mich., assignors to Rohm & Haas Company, Philadelphia, Pa., a corporation of Delaware
No Drawing. Filed Feb. 8, 1963, Ser. No. 257,069
7 Claims. (Cl. 260—551)

This invention is concerned with adducts of lower alkyl halides, lower alkoxymethyl halides, and aralkyl halides with tetrakis(tert-alkyl)-1,3,2,4-diazadiphosphetidines as new compounds and a process for preparing them.

The diazadiphosphetidinium salts so formed may be represented by the general formula

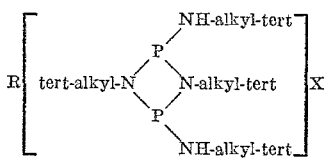

wherein tert-alkyl is a tertiary alkyl group containing up to about eleven carbon atoms; R is a lower alkyl group containing from 1 to 4 carbon atoms, a lower alkoxymethyl group of the formula R*OCH$_2$— wherein R* is an alkyl group of 1 to 4 carbon atoms, and a benzyl group which may be unsubstituted or substituted with 1 or 2 alkyl groups containing a total of 1 to 13 carbon atoms; and X is a halide exemplified by bromide, chloride, and iodide.

Diazadiphosphetidinium salts are new chemical structures. They possess biocidal properties and are particularly useful as fungicides and algaecides.

The diazadiphosphetidinium salts may be prepared by the following steps:

(1) A tertiary-alkylamine is reacted with phosphorus trichloride to give a phosphazo compound, which may be denoted by the general structure (tert-alkylNHP=N alkyl-tert)$_m$ wherein $m$ is 1 or 2;

(2) Such phosphazo compound is reacted with a quaternizing agent, RX, of the lower alkyl halide, lower alkoxymethyl halide, and benzyl halide types. Only one mole of the quaternizing agent reacts with the phosphazo compound whether the phosphazo is in the monomeric or dimeric form.

Phosphazo compounds of the general formula (RN=P—NHR)$_n$ where $n$ is 1 or 2 and R is a phenyl group, have been described in the literature. U.S. Patent No. 2,302,703 and U.S. 2,380,454 reveal the use of "anilides of phosphazoaromatics," that is, where R in the above general formula is aryl, as constituents of lubricants. The exact structure of the phosphazo compounds is still open to argument and further proof. The phosphazo compounds described in this invention appear to exist as dimers ($n$ is 2 in the general formula) and they partially dissociate to the monomers ($n$ is 1 in the general formula) under certain conditions; for example, when heated in solution. This agrees with the observations of Grimmel et al. as discussed in the Journal of the American Chemical Society 68, 539–542 (1946) and Goldschmidt et al. in Annalen der Chemie 595, 193–202 (1955), where one suggested structure for the dimer is the substituted 1,3,2,4-diazadiphosphetidine ring

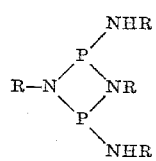

where R is cycloalkyl or n-alkyl group or an aromatic radical. Phosphazo compounds are often sensitive to moisture and to alcohols. In general, it appears that those compounds derived from aromatic amines are less stable than those derived from aliphatic amines.

When phosphorous trichloride is reacted with tertiary-alkylamines to form the phosphazo compounds the resulting compounds exist in the monomeric state, tert-alkylNHP=Nalkyl-tert the dimeric state (tert-alkylNHP=Nalkyl-tert)$_2$, or mixtures of the two. From molecular weight determinations and nuclear magnetic resonance measurements, these phosphazo compounds appear to exist predominantly in the dimeric form as the four-membered diazadiphosphetidine ring, and accordingly, these structures and this nomenclature are used herein. The reaction may be shown by the following equation:

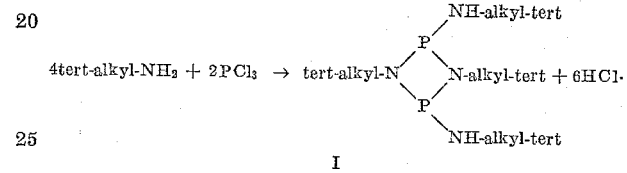

I

The resulting tetrakis(tert-alkyl)-1,3,2,4-diazadiphosphetidines depicted in Formula I used herein as intermediates are new compositions of matter. The general method for their preparation is to react phosphorous trichloride with at least two molar equivalents of a tertiary-alkylamine between about −20° and 100° C., preferably between 20° and 80° C., by mixing in the presence of an acid acceptor such as an excess of the tertiary-alkylamine reactant, a tertiary amine, such as triethylamine, pyridine, or benzyldimethylamine, or an inorganic base such as calcium carbonate, best in an anhydrous, inert solvent, such as octane, toluene, ethylene dichloride, dipropyl ether, or dioxane. An exotherm frequently develops and should be controlled. It is usually desirable to warm the reaction mixture after the mixing of the reactants to ensure completion of the reaction; however, diazadiphosphetidines have on occasion exhibited heat sensitivity and definite decomposition above 100° C. and the temperature should, therefore, be controlled below the point where there is evidence of decomposition. The product may be isolated by removing the amine hydrochloride or salt which forms as a precipitate, concentrating the filtrate, and, if desired, purifying by conventional methods such as recrystallization.

The tertitary-alkylamines preferred may be represented by the formula

C$_n$H$_{2n+1}$C(CH$_3$)$_2$NH$_2$ wherein $n$ is a number from 1 to 8; i.e., the tertiary alkyl group may contain from 4 to 11 carbon atoms. The most usual and commercially available of these are tert-butylamine, tert-octylamine, and tert-nonylamine which is usually prepared as a mixture wherein $n$ in the general formula has principally the value of 6 to 7 and has a neutral equivalent of about 142. Higher molecular weight tertiary alkylamines such as those wherein the carbon content of the tertiary-alkyl group is from 12 to 24 carbon atoms are commercially available but react somewhat sluggishly to give ill-defined products, and the reaction of these phosphazo compounds with quaternizing agents presents difficulties and results in products which have reduced fungicidal properties and are generally impractical.

The diazadiphosphetidinium salts of this invention are prepared by mixing of reactive organic halides and the tetrakis(tert-alkyl)-1,3,2,4-diazadiphosphetidines of Formula I with or without the presence of an inert solvent, most often at room temperature followed by a heating period to complete the reaction. Temperatures between 20° and 100° C. may be used depending upon the particular activity of the reactants. In general, it is desirable to keep the temperature below the point where depolymerization of the dimeric diazadiphosphetidine commences and yet as high as possible to allow the quaternization reaction to proceed at a reasonable rate. It is best to use an anhydrous solvent as the reaction medium—typical ones are diisopropyl ether, dioxane, methyl ethyl ketone, xylene, acetonitrile, and nitromethane.

The reactive organic halides employed in this invention are:

(1) Lower alkyl bromides, chlorides, and iodides wherein the alkyl group contains 1 to 4 carbon atoms, such as methyl iodide, ethyl bromide, isopropyl bromide, and butyl chloride, (2) Lower alkoxymethyl bromides, chlorides, and iodides wherein the lower alkoxy group contains 1 to 4 carbon atoms, such as methoxymethyl chloride, ethoxymethyl iodide, and isobutoxymethyl iodide, and (3) Benzyl bromides, chlorides, or iodides, wherein the benzyl group may be unsubstituted or substituted with 1 or 2 alkyl groups containing a total of 1 to 13 carbon atoms, such as benzyl bromide, methylbenzyl chlorides, and dodecylbenzyl, dibutylphenyl, and dodecylmethylbenzyl iodides. These quaternizing halides are preferably used in approximately stoichiometric proportions to the diazadiphosphetidines. In the case of the more volatile reactive halides such as those with boiling points below 100° C., an excess of the halide is often employed and these reactions are often run under pressure to minimize loss of the halides. The resulting diazadiphosphetidinium halide often precipitates from the reaction mixture and is conveniently isolated by filtration. In cases where the product is soluble in the reaction solvent, it may be isolated by concentration of the reaction mixture. The products are often solids which may be purified by recrystallization.

The following examples merely illustrate the invention and are not to be construed as limiting it. Parts are by weight unless otherwise designated.

EXAMPLE 1

*Preparation of methyl-1,2,3,4-tetrakis-tert-octyl-1,3,2,4,- diazadiphosphetidinium iodide*

(a) PREPARATION OF DIMERIC N,N'-DI-TERT-OCTYLPHOSPHENIMIDOUS AMIDE
[TERT-C$_8$H$_{17}$NHP=NC$_8$H$_{17}$-TERT]$_2$

A thoroughly-dried, 5-liter flask equipped with a stirrer, condenser, thermometer and addition funnel is charged with a solution of 607 grams (6 moles) of triethylamine and 517 grams (4 moles) of tert-octylamine in 1.5 liter of octane. The solution is cooled to 5° C. and the cooling bath removed. A solution of 275 grams (2 moles) of phosphorus trichloride in 250 ml. of octane is added dropwise. An exotherm develops and the temperature is allowed to rise to about 80° C. and thereafter the addition rate is adjusted to maintain that temperature. During the addition, triethylamine hydrochloride separates. After the addition is complete, the reaction mixture is allowed to stand overnight. The precipitated solid is filtered off and the residue is washed with acetone. The filtrate and washings are combined and the solvents removed by concentrating at reduced pressure on a steam bath. The residue solidifies on cooling and amounts to 307 grams of a white solid melting at 64° to 67° C. Recrystallization from acetone gives a white solid melting at 63° to 65° C. This contains by analysis 66.91% C, 12.43% H, 9.61% N and 10.88% P; calculated for (C$_{16}$H$_{35}$N$_2$P)$_2$ is 67.07% C, 12.33% H, 9.77% N, and 10.81% P. The molecular weight of the solid as determined with a benzene solution at 39° C. in an osmometer by a method involving the lowering of the vapor pressure is found to be 571. Calculated for (C$_{16}$H$_{35}$N$_2$P)$_2$ is 572.9. Molecular weight determination by the ebullioscopic method in benzene gives 531 and in acetone gives 425 which shows that some dissociation occurs at elevated temperatures, particularly in a polar solvent. Nuclear magnetic resonance measurements indicate the structure of the undissociated product as that of 1,2,3,4-tetrakis-tert-octyl-1,3,2,4-diazadiphosphetidine, which is a dimeric N,N'di-tert-octylphosphenimidous amide.

When in the above preparation an equivalent quantity of tert-butylamine is substituted for tert-octylamine and the reaction is run in an autoclave at an upper temperature of about 70°, there is produced 1,2,3,4-tetrakis-tert-butyl-1,3,2,4-diazadiphosphetidine, which is a dimetric N,N'-di-tert-butylphosphenimidous amide. The product is a viscous oil or gum.

If in the above reaction there is substituted an equimolar quantity of tert-nonylamine for tert-octylamine, concentration of the filtrate and washings produces a gum which by analysis is found to be 1,2,3,4-tetrakis-tert-nonyl-1,3,2,4-diazadiphosphetidine, which is a dimeric N,N'-di-tert-nonylphosphenimidous amide.

(b) PREPARATION OF METHYL IODIDE MONO-ADDUCT OF DIMERIC N,N'-DI-TERT-OCTYLPHOSPHENIMIDOUS AMIDE

A solution of 11.4 parts (0.02 mole) of dimeric N,N'-di-tert-octylphosphenimidous amide in 17 parts of isopropyl ether is placed in a three-necked flask outfitted with a stirrer and reflux condenser. To this is added in one portion 8 parts (0.055 mole) of methyl iodide. The reaction mixture is then heated to reflux for two hours. When the mixture is cooled to room temperature, a solid precipitates. It is isolated by filtration, washed with anhydrous ether, and dried in a vacuum desiccator. The product amounts to 7.5 parts of a white powder which melts at 134° to 137° C. By analysis it contains 53.4% C, 10.1% H, 20.5% I, 7.4% N, and 8.3% P; calculated for C$_{33}$H$_{73}$IN$_4$P is 55.50% C, 10.22% H, 17.75% I, 7.70% N, and 8.67% P. By calculation, the product is a mixture of about 80% of methyl-1,2,3,4-tetrakis-tert-octyl-1,3,2,4-diazadiphosphetidinium iodide having the structure

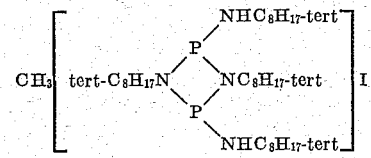

and 20% of methyl - tert - octylamino-tert-octylimino-phosphonium iodide,

When the same reaction is carried out with stoichiometric proportions of 1,2,3,4-tetrakis-tert-butyl-1,3,2,4-diazadiphosphetidine and methyl iodide, there is obtained gummy material containing a major proportion of methyl-1,2,3,4, - tetrakis - tert - butyl-1,3,2,4-diazadiphosphetidinium iodide.

Likewise, when 1,2,3,4 - tetrakis-tert-nonyl-1,3,2,4-diazadiphosphetidine and methyl iodide are reacted as above, a substantial quantity of meythl-1,2,3,4-tetrakis-tert-nonyl-1,3,2,4-diazadiphosphetidinium iodide is produced as a viscous gum.

EXAMPLE 2

*Preparation of methyl-1,2,3,4-tetrakis-tert-octyl-1,3,2,4-diazadiphosphetidinium chloride*

Into the glass liner of a Parr bomb type autoclave is placed a chilled solution of 7 parts (0.138 mole) of methyl chloride in 63 parts of anhydrous diethyl ether. To this is added 14.3 parts (0.025 mole) of dimeric N,N'-di-tert-octylphosphenimidous amide. The mixture is then reacted in the Parr bomb at 75° to 80° C. for 18 hours. The reaction mixture is cooled, transferred to a rotary evaporator, and the ether is removed under reduced pressure at room temperature. There is left 15 parts of a viscous oil. This contains by analysis 4.0% Cl and 8.8% N and calculates for 70% conversion to methyl-1,2,3,4 - tetrakis-tert-octyl-1,3,2,4-diazadiphosphetidinium chloride.

When in the above reaction there is substituted an equimolar quantity of methyl bromide for the methyl chloride, similar observations are made and there results a substantial yield of methyl-1,2,3,4-tetrakis-tert-octyl-1,3,2,4-diazadiphosphetidinium bromide as a viscous oil.

EXAMPLE 3

*Preparation of methoxymethyl-1,2,3,4-tetrakis-tert-octyl-1,3,2,4-diazadiphosphetidinium chloride*

Into a 3-necked flask outfitted with a stirrer, thermometer, and reflux condenser is placed 11.4 parts (0.02 mole) of dimeric N,N'-di-tert-octylphosphenimidous amide and 3.2 parts (0.04 mole) of distilled methyl chloromethyl ether. The mixture is stirred for 4 hours at 95° to 100° C. The resulting product is cooled to give a viscous light green oil. This oil is treated with about 50 parts of anhydrous diethyl ether which leaves a white insoluble solid which is filtered off and dried in a vacuum desiccator. The white solid is 0.5 part and melts with effervescence at 209° to 212° C. This solid is found to contain by analysis 9.69% Cl and 7.74% N and is less than 5% yield of essentially pure methoxymethyl-tert-octylamino-tert-octyliminophosphonium chloride,

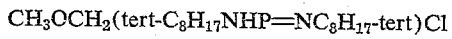

The ether is removed from the filtrate by warming under reduced pressure and 10 parts of an oil residue results. This oil is found by analysis to contain 2.2% Cl, 8.8% P, and 8.1% N and calculates for 40% of methoxymethyl-1,2,3,4 - tetrakis-tert-octyl-1,3,2,4-diazadiphosphetidinium chloride,

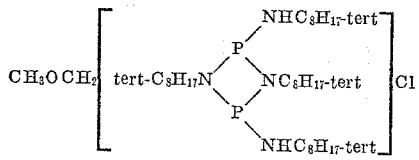

with the major impurity being unreacted dimeric N,N'-di-tert-octylphosphenimidous amide.

EXAMPLE 4

*Preparation of dodecylbenzyl-1,2,3,4-tetrakis-tert-octyl-1,3,2,4-diazadiphosphetidinium iodide*

A 3-necked flask outfitted with a stirer, thermometer, and reflux condenser is charged with 14.3 parts of dimeric N,N'-di-tert-octylphosphenimidous amide, 19.3 parts of dodecylbenzyl iodide, and 200 parts of reagent grade acetone. By means of an electric heating mantle, the reaction mixture is heated to reflux temperature with stirring for about 24 hours. No precipitate forms when the reaction mixture is cooled. The solvent is removed by warming under reduced pressure and there is left a residue of 24 parts of yellow viscous oil. This oil contains by analysis 16.0% I which calculates for a 50:50 mixture of dodecylbenzyl - 1,2,3,4-tetrakis-tert-octyl-1,3,2,4-diazadiphosphetidinium iodide,

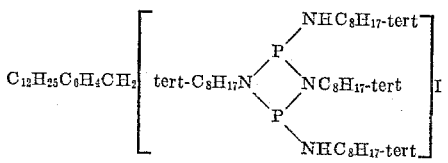

and dodecylbenzyl - tert - octylamino-tert-octyliminophosphonium iodide,

The compounds of this invention are useful as pesticides and in particular as fungicides. When so used, they are generally formulated for subsequent dissemination as pesticides, employing methods well known to those skilled in the art. Suitable formulations which are useful for the diazadiphosphetidinium salts of this invention include emulsion concentrates, wettable powders, dusts, granulars, aerosols, and flowable emulsion concentrates. In such formulations the diazadiphosphetidinium salts are extended with a liquid or solid carrier and, when desired, suitable surfactants are incorporated.

When the compounds are to be formulated as emulsion concentrates, they are taken up in an organic solvent such as xylene, alkylated naphthalenes, pine oil, or dimethyl phthalate or a mixture of solvents together with an emulsifying agent. A special type of emulsion concentrate may be made as a flowable emulsion in which the diazadiphosphetidinium salt is incorporated into a water-immiscible inert solvent containing surface-active agents, and then water is added in sufficient amount to produce a thick emulsion which is just pourable. The concentration of the active ingredient in emulsion concentrates is usually 10–25%, whereas in the flowbale formulations this may be as high as 75%.

Wettable powder formulations may be made by incorporating the compounds in finely divided solids such as clays and inorganic carbonates and silicates and admixing with wetting agents, dispersing agents, and/or other surface-active agents. The concentration of active ingredients in such formulations is usually in the range of 20 to 50%.

Dusts are prepared by mixing with finely divided inert solids which may be organic or inorganic in nature. Materials useful for this purpose include botanical flours, silicas, silicates, carbonates, and clays. One convenient method of preparing a dust is to dilute a wettable powder with a finely divided carrier. Dust concentrates containing from 20 to 80% of the active ingredient are commonly made and are subsequently diluted to 1 to 10% use concentration.

The compounds were evaluated as fungicides in the standard slide spore germination test (cf. Phytopathology, 33, 627 (1943), utilizing spores of *Alternaria solani* (A.s.), *Monilinia fructicola* (M.f.) and *Stemphylium sarcinaeforme* (S.s.). The values obtained for the concentration in parts per million (p.p.m.) which effectively controlled 50% of the spores (ED$_{50}$) are given in Table I.

Representative compounds were evaluated in greenhouse tests for their activity on tomato late blight, *Phytophthora infestans* (P.i.). Several were found to be quite effective and to give controls similar to standard materials used to prevent this disease without lasting injury to the young tomato plants. Table I includes typical ED$_{50}$ values against this organism.

TABLE I

*ED$_{50}$ values for typical diazadiphosphetidinium salts*

| The compound of the monoadduct of dimeric N,N'-di-tert-octylphosphenimidous amide with— | ED$_{50}$ (p.p.m.) | | | |
|---|---|---|---|---|
| | A.s. | M.f. | S.s. | P.i. |
| Methyl iodide (Example 1b) | <10 | <1 | <1 | 224 |
| Methyl chloride (Example 2) | <200 | <50 | <50 | 262 |
| Methoxymethyl chloride (Example 3) | <1,000 | <1,000 | <1,000 | 1,029 |
| Dodecylbenzyl iodide (Example 4) | <1,000 | <50 | <50 | 125 |

The compounds of this invention possess considerable fundicidal activity, and lower alkyl 1,2,3,4-tetrakis-tert-octyl-1,3,2,4-diazadiphosphetidinium iodides are particularly outstanding as fungicidies.

In field tests it has been found that methyl-1,2,3,4-tetrakis-tert-octyl - 1,3,2,4 - diazadiposphetidinium iodide shows promising disease control on such diverse fungal diseases as downy mildew on cucumbers (*Pseudoperonospora cubensis*), gray leaf spot of tomatoes (*Stemphylium*

*solani*), early blight of celery (*Cercospora apii*), early blight of tomatoes (*Alternaria solani*), and powdery mildew of squash (*Erysiphe cichoracearum*) without undue phytotoxicity to the host plants.

The compounds of this invention also exhibit algaecidal properties. They do not appear to possess promising bacteriostatic properties.

The diazadiphosphetidinium salts of this invention are conveniently made directly in the form of their bromides, chlorides, or iodides. If salts containing anions other than halides are desired, they may be made by replacement of the halide ions by conventional methods, such as double decomposition reactions with the sodium salts of anions such as p-toluenesulfonate, methanosulfonate, lignosulfonate, acetate, and ferrocyanide.

This invention provides a new class of organic phosphorus compound which is quaternary in nature and may be referred to as diazadiphosphetidinium salts. They are made from novel members of the class of phosphazo compounds which may be specifically termed N,N'-di-tert-alkylphosphenimidous amides and which in the dimeric form are known as 1,2,3,4-tetrakis-tert-alkyl-1,3,2,4-diazadiphosphetidines. The compounds of this invention are readily made by convenient and economic processes from readily available raw materials. The diazadiphosphetidinium salts of this invention provide new biocidal agents for various types of pest control and are outstandingly useful for the control of fungi attacking plants and algae.

We claim:
1. A compound of the formula

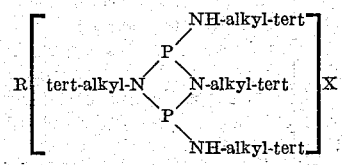

wherein tert-alkyl is a tertiary alkyl group containing 4 to 11 carbon atoms; R is a member of the group consisting of lower alkyl groups of 1 to 4 carbon atoms, lower alkoxymethyl groups of the formula R*OCH$_2$— wherein R* is a lower alkyl group of 2 to 4 carbon atoms, and benzyl groups of the formula

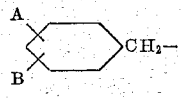

wherein A and B are selected from the class consisting of hydrogen and alkyl groups of 1 to 12 carbon atoms, the sum of carbon atoms being 1 to 13 when A and B are both alkyl; and X is a member of the class of anions consisting of bromide, chloride, and iodide.

2. Methyl-1,2,3,4-tetrakis - tert - butyl-1,3,2,4-diazadiphosphetidinium iodide.

3. Methyl - 1,2,3,4 - tetrakis-tert-octyl-1,3,2,4-diazadiphosphetidinium iodide.

4. Methyl - 1,2,3,4 - tetrakis-tert-octyl-1,3,2,4-diazadiphosphetidinium chloride.

5. Methoxymethyl - 1,2,3,4 - tetrakis-tert-octyl-1,3,2,4-diazadiphosphetidinium chloride.

6. Dodecylbenzyl - 1,2,3,4 - tetrakis-tert-octyl-1,3,2,4-diazadiphosphetidinium iodide.

7. Methyl - 1,2,3,4 - tetrakis-tert-nonyl-1,3,2,4-diazadiphosphetidinium iodide.

References Cited by the Examiner

Grimmel et al.: J. Am. Chem. Soc., vol. 68, pages 539–542 (1946).

Kosolapoff: "Organo-phosphorous Compounds," pages 326–327, John Wiley and Sons (N.Y.) (1950).

IRVING MARCUS, *Primary Examiner*.

JOHN D. RANDOLPH, *Examiner*.

UNITED STATES PATENT OFFICE
CERTIFICATE OF CORRECTION

Patent No. 3,187,040

June 1, 1965

Harold F. Wilson et al.

It is hereby certified that error appears in the above numbered patent requiring correction and that the said Letters Patent should read as corrected below.

Column 8, line 5, for "2 to 4" read -- 1 to 4 --; line 14, for "1 to 13" read -- 2 to 13 --.

Signed and sealed this 5th day of October 1965.

(SEAL)
Attest:

ERNEST W. SWIDER
Attesting Officer

EDWARD J. BRENNER
Commissioner of Patents